A. H. REED.
MOWING MACHINE.
APPLICATION FILED APR. 11, 1917.
1,275,599.
Patented Aug. 13, 1918.
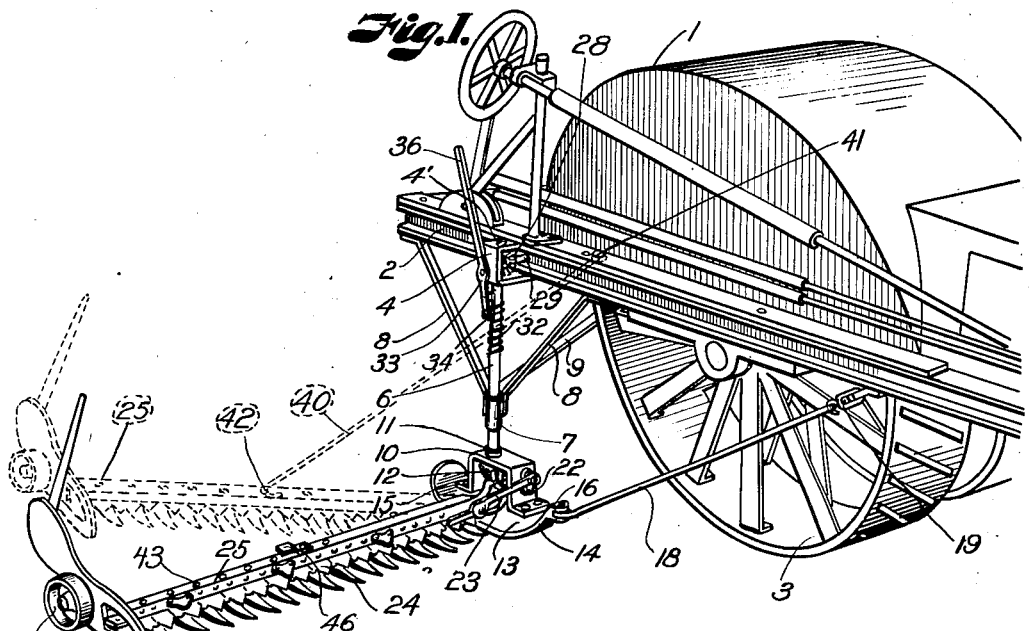
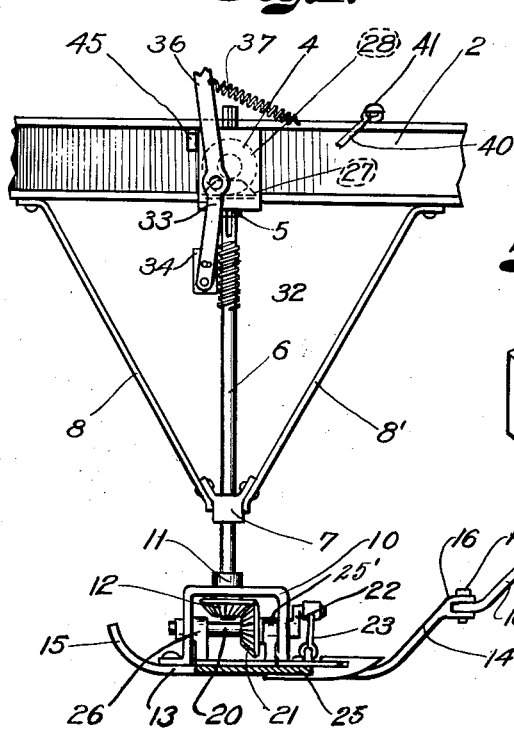
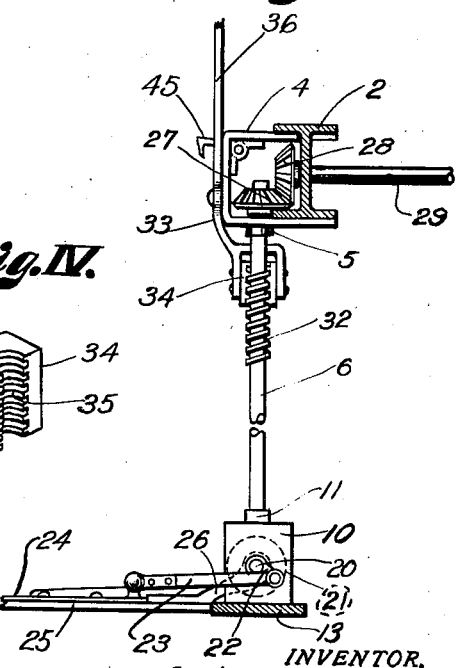
INVENTOR.
Andrew H. Reed.
BY Arthur C. Brown
ATTORNEY

UNITED STATES PATENT OFFICE.

ANDREW H. REED, OF KANSAS CITY, MISSOURI, ASSIGNOR OF ONE-HALF TO H. SAHLER, OF KANSAS CITY, MISSOURI.

MOWING-MACHINE.

1,275,599. Specification of Letters Patent. Patented Aug. 13, 1918.

Application filed April 11, 1917. Serial No. 161,155.

*To all whom it may concern:*

Be it known that I, ANDREW H. REED, a citizen of the United States, residing at Kansas City, in the county of Jackson and State of Missouri, have invented certain new and useful Improvements in Mowing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mowing machines and more particularly to mechanism for supporting a device of this character from a tractor frame, and operating it from the tractor motor, the principal object of the invention being to provide means for adjustably mounting a sickle and its driving parts so that it may be moved to and from the ground as required, together with a shaft and gear mechanism for operating the sickle from a driven shaft on the tractor.

In accomplishing these objects, I have provided improved details of structure, the preferred forms of which are illustrated in the accompanying drawings, wherein:

Figure I is a perspective view of a portion of a tractor showing a mowing device constructed according to my invention mounted thereon.

Fig. II is a side view showing the sickle driving shaft and the means for effecting its vertical adjustment.

Fig. III is an end view of the same showing the mounting of the sickle bar and pitman.

Fig. IV is a detail perspective view of the shaft clutch head.

Referring more in detail to the drawings:

1 designates a tractor, which may be of any ordinary construction comprising frame side rails 2 and drive wheels 3.

Mounted on the outside of the rail 2 is a U-shaped bracket 4 having an aperture 4' in its upper portion and comprising a bearing 5 at its base portion within which a vertical shaft 6 is slidably and revolubly mounted; the shaft being similarly mounted adjacent its lower end in a bearing collar 7 that is rigidly carried by arms 8—8' attached thereto and extended upwardly in opposite directions and attached to the frame 2, and by an arm 9 that extends transversely across the frame and is attached to the opposite side of the tractor frame to hold the bearing rigidly against any lateral or longitudinal movement relative to the frame 2.

Mounted on the lower end of the shaft 6 is an inverted U-shaped bracket 10, having a bearing 11 at its base for revolubly receiving the lower end of the shaft 6, and the bracket is held on the shaft by means of a bevel gear wheel 12 that is fastened to the end of the shaft within the bracket.

Supported by the bracket 10 is a shoe 13, having upturned forward and rearward ends 14—15 and attached to the forward end in a forked head 16, by means of a pin 17 that may be extended through registering apertures in the parts, is a rod 18 which extends forwardly and is attached through a flexible connecting link 19, with the side rail 2, so that the shoe 13 will be held parallel with the frame and pivotal movement on the shaft 6 normally prevented; the pin 17, in this case, is preferably of wood so that should unusual stress be placed on the sickle bar such as would be caused by the sickle hitting a stump or stone, the pin will shear off and the sickle allowed to swing on its pivotal mounting to prevent possible damage to the machine parts.

Mounted revolubly in the bracket 10 is a horizontal shaft 20, which is operatively connected with the shaft 6, by means of a bevel gear wheel 21, which meshes with the gear wheel 12 and at the forward outer end of the shaft is a crank arm 22 with which one end of a pitman bar 23, is pivotally connected, the opposite end of the pitman being connected with a sickle 24, that is slidably mounted in a sickle bar 25; the latter being pivotally mounted on the shoe so that it may be raised or lowered at its outer end, by means of spaced arms 26, which are fixed to the inner end of the bar 25 and comprise end bearings 25' by which the arms are revolubly carried on the shaft 20. Means for driving the shaft 6, to operate the sickle 24, comprises a bevel gear wheel 27, that is slidably keyed on the shaft 6 within the bracket 4 and is adapted to mesh with gear wheel 28 fixed on a shaft 29, that may be driven from the tractor motor in any suitable manner, so that rotation of the shaft 29, through the gear wheels 28 and 27, revolves the shaft 6 and the latter, through the gear wheels 21 and 12 drives the shaft 20 and crank arm 22 to operate the pitman 23 to move the sickle 24 along the sickle bar, so that the cutting portions of the sickle will coöperate with the teeth on the sickle bar to effect cutting of grain or grass in which the machine is being operated.

In order that the shoe 13 may be raised from the ground to permit an easier turning operation, I provide the shaft 6, adjacent its upper end with a threaded surface 32, and mounted on the side of the bracket 4, is a lever 33, which carries at its lower end a block 34 having a threaded face 35 adapted to receive the threads on the shaft 6, so that when the upper arm 36, of the lever 33 is moved rearwardly, the block face 35 will engage the threaded face of the shaft 6 and rotation of the latter will cause it to follow the block threads to lift the shoe 13 upwardly from the ground. After the shoe has been raised, the driving shaft 29 is thrown out of gear (by means not shown), to prevent a further raising and binding of parts, and the turn made; the outer end of the cycle bar being supported by the runner wheel 36' mounted at the outer end of the bar.

After a turn of the tractor has been made, the operator then releases the lever 33 and the shaft 6 drops the shoe 13 to the ground in cutting position, and the shaft 29 is again thrown in gear.

I also attach a spring 37 to the lever arm 36 and to the frame rail 2, to normally retain the block 34 away from the threaded portion of the shaft 6.

In order that the sickle may be held at any incline desired, I provide a rod 40 which is pivotally attached to the tractor frame 2 by a bolt 41 and is provided at its outer end with a hook 42 adapted to seat in apertures 43 spaced along the sickle bar 25, it being apparent that by seating the hook in the bar at different distances along the bar the latter may be held at different degrees of inclination.

I also mount a latch hook 45 in the bracket 4 which is adapted to seat back of an ear 46 fastened on the sickle bar when the latter is raised in vertical position, to hold the sickle off of the ground while not in use.

By so constructing the device, it will be seen that the sickle may be operated from the tractor motor and that by providing the shearing pin 17, should the sickle strike a solid body, the pin will shear to allow pivoting of the sickle bar in its mounting and thus avoid injuring the machine.

It is also apparent that the slidable mounting of the shaft 6 in the bearing 4 and the flexible connection of the rod 18 will permit vertical adjustment of the shoe 13, so that the cutting parts may be held from the ground while the machine is being moved between fields or while a turn is being made.

Having thus described my invention, what I claim as new therein, and desire to secure by Letters-Patent, is:

1. The combination with a tractor having a frame and a motor driven shaft, of a bracket mounted on the frame, a bearing rigidly suspended from the frame vertically below the bracket, a shaft revolubly carried by the bracket and bearing and longitudinally movable therein, a mowing device carried at the lower end of said shaft and operatively connected therewith, a bevel gear wheel on the motor driven shaft, a bevel gear wheel slidably keyed on the vertical shaft and retained by the bracket in mesh with the gear wheel on the motor shaft, and means for raising or lowering the vertical shaft to raise and lower the mowing device.

2. The combination with a tractor having a frame and a motor driven shaft, of a bracket mounted on the frame, a bearing suspended from the frame vertically below the bracket, a shaft revolubly and longitudinally movable in said bracket and bearing and having a threaded portion between the bracket and bearing, a mowing device carried at the lower end of said shaft and operatively connected therewith, means for operatively connecting the vertical shaft with the motor shaft, and a threaded member movable into and from engagement with the threaded portion of the vertical shaft for raising or lowering the vertical shaft to effect corresponding movement of the mowing device.

3. The combination with a tractor having a frame and a motor driven shaft, of a bracket mounted on the frame, a bearing rigidly suspended from the frame vertically below the bracket, a shaft revolubly carried by the bracket and bearing, longitudinally movable therein and having a threaded portion between the bracket and bearing, a mowing device mounted at the lower end of the vertical shaft and operated thereby, a bevel gear wheel on the motor driven shaft, a bevel gear wheel slidably keyed on the vertical shaft and retained by the bracket in mesh with the gear on the motor driven shaft, a lever arm pivotally mounted on the bracket, a block mounted at the lower end of said lever having a threaded surface for receiving the threaded portion of the vertical shaft and mounted in position to be moved into and out of engagement therewith for the purpose set forth.

4. The combination with a tractor having a frame and a motor driven shaft, of a bracket mounted on the frame, a bearing rigidly suspended from the frame vertically below the bracket, a shaft revolubly carried by the bracket and bearing and longitudinally movable therein, a bevel gear wheel on the motor driven shaft, a bevel gear wheel slidably keyed on the vertical shaft and retained by the bracket in mesh with the first-named gear wheel, a mowing device mounted at the lower end of said shaft comprising a carrying bracket revolubly mounted on the shaft, a shoe suspended from the bracket, a sickle bar pivotally mounted on the said shoe, a sickle mounted on said sickle bar and operatively connected with the vertical shaft, a rod flexibly connected with the tractor frame and said shoe to retain the mowing parts in functional position, and means for moving the vertical shaft longitudinally, for the purpose set forth.

In testimony whereof I affix my signature.

ANDREW H. REED.